Figure 1:
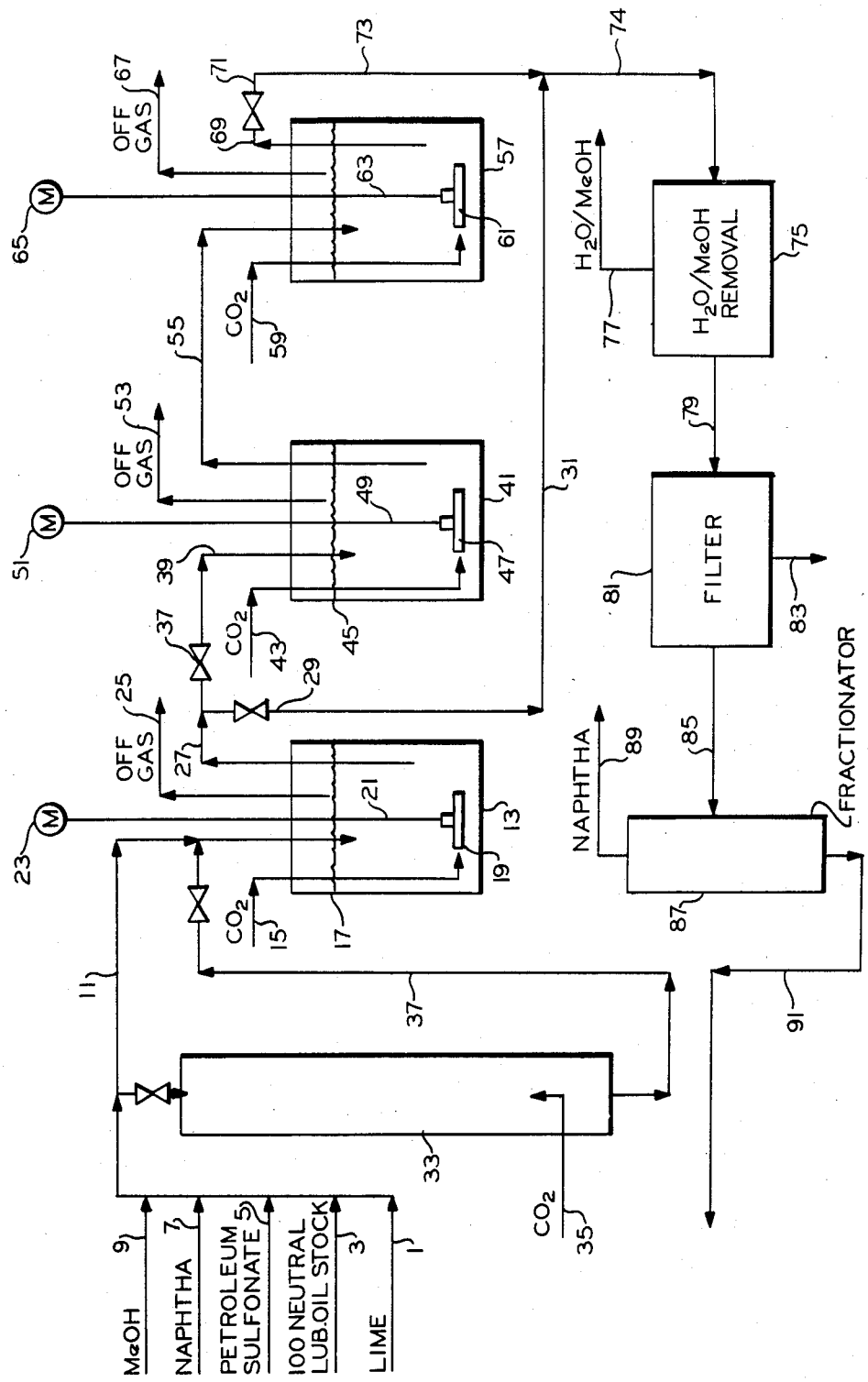

United States Patent [19]

Spence et al.

[11] Patent Number: 4,664,246
[45] Date of Patent: May 12, 1987

[54] APPARATUS FOR PRODUCING AND RECOVERING OVERBASED PETROLEUM SULFONATE

[75] Inventors: J. Ronald Spence; Douglas S. Jack, both of Bartlesville, Okla.

[73] Assignee: Phillips Petroleum Company, Bartlesville, Okla.

[21] Appl. No.: 734,642

[22] Filed: May 16, 1985

Related U.S. Application Data

[62] Division of Ser. No. 594,641, Mar. 28, 1984, Pat. No. 4,543,194.

[51] Int. Cl.$^4$ ............................................. C10G 51/00
[52] U.S. Cl. ...................................... 196/46.1; 196/155; 422/188; 422/231
[58] Field of Search ..................... 196/46, 46.1, 155; 252/18, 25, 33, 33.2; 422/188, 225, 231

[56] References Cited

U.S. PATENT DOCUMENTS

| 2,902,448 | 9/1959 | Collins | 252/33 |
|---|---|---|---|
| 3,105,049 | 9/1963 | Voorhees | 252/33 |
| 3,135,693 | 6/1964 | Whitney et al. | 252/33 |
| 3,155,616 | 11/1964 | Voorhees | 252/33 |
| 3,318,809 | 5/1967 | Bray | 252/33 |
| 3,377,283 | 4/1968 | McMillen | 252/33 |
| 3,488,722 | 1/1970 | Allphin, Jr. | 252/33 |
| 3,523,898 | 8/1970 | DeVault | 252/33 |
| 3,658,703 | 4/1972 | Gragson et al. | 252/33 |
| 3,761,411 | 9/1973 | Dickey | 252/33 |
| 4,086,170 | 4/1978 | De Clippelier et al. | 252/33 |
| 4,165,291 | 8/1979 | Gragson | 252/33 |
| 4,251,379 | 2/1981 | Le Coent et al. | 252/33 |
| 4,541,938 | 9/1985 | Jack et al. | 252/18 |
| 4,541,939 | 9/1985 | Jack | 252/18 |
| 4,541,940 | 9/1985 | Spence | 252/18 |
| 4,557,840 | 10/1985 | Jack et al. | 252/18 |

Primary Examiner—David L. Lacey
Attorney, Agent, or Firm—A. W. Umphlett

[57] ABSTRACT

Apparatus is provided for overbasing a petroleum sulfonate in a multi-vessel reaction system in which a first reactor is a plug flow reactor in which a feedstock is fed in the top of the first reactor with carbon dioxide fed near the bottom of the first reactor and with the product of the first reactor passed to a second reactor that is a continuous stirred tank reactor for additional reaction with carbon dioxide. Optionally, the continuous stirred tank reactor is the first in a series of continuous stirred tank reactors with passing a product effluent seriatim through the series of reactors and recovery of product from the last reactor in the series.

9 Claims, 1 Drawing Figure

APPARATUS FOR PRODUCING AND RECOVERING OVERBASED PETROLEUM SULFONATE

This is a divisional application of a co-pending application, Ser. No. 594,641, filed on Mar. 28, 1984 now U.S. Pat. No. 4,543,194.

BACKGROUND OF THE INVENTION

This invention relates to overbasing a calcium petroleum sulfonate. In another of its aspects this invention relates to the preparation of a lubricating oil additive. In still another of its aspects this invention relates to the production of calcium petroleum sulfonate having a high total base number (TBN) for use as an additive in lubricating oils, particularly crankcase oils for internal combustion engines to impart detergency and reduce sludge formation.

In one of its concepts this invention provides a process for overbasing a calcium petroleum sulfonate by manipulation of process steps or process conditions, particularly the addition of carbon dioxide, to provide a product having a TBN in desirable range.

Among the materials that impart detergency to lubricating oils thereby being of assistance in keeping internal engine parts clean and reducing sludge formation in the oil are overbased calcium petroleum sulfonates. These sulfonates are known to be useful as additives for lubricating oils, particularly crankcase oils for internal combustion engine.

It is known that equivalent detergency characteristics can be obtained with a lower concentration of additive in a lubricating oil using an additive of higher alkaline reserve—the higher the alkaline reserve of an additive: the larger the quantity of acidic combustion products accumulated in the oil to which the additive is added that can be neutralized by the additive. The measurement of alkaline reserve is reported as total base number (TBN) which is the number of milligrams of potassium hydroxide equivalent to the amount of acid required to neutralize the alkaline constituents present in one gram of sample. An additive having a total base number higher than can be obtained from calcium petroleum sulfonate alone is commonly said to be "overbased" or, alternatively, is said to be "superbasic".

Petroleum sulfonic acid which is neutralized to form petroleum sulfonates normally includes appreciable amounts of various hydrocarbons not having the acid group capable of forming the sulfonate so that the resulting product is a mixture of hydrocarbons and petroleum sulfonates. When the sulfonic acid is neutralized with an excess of CaO or $Ca(OH)_2$ to form the sulfonate, the resulting product has a relatively small alkaline reserve. The addition of a large excess of neutralizing material normally does not materially increase the alkaline reserve since the excess material is removed, usually by filtration, prior to the use of the sulfonate in a lubricant. The previously known processes for overbasing calcium petroleum sulfonates have experienced difficulty in obtaining sufficiently high alkaline reserves, e.g., TBN of 300 mg KOH/gm or higher, to enable the formulator to use lower amounts of additive while maintaining equivalent detergency or to protect the engine adequately under conditions of high acid formation in the combustion process.

It has now been found that the use of a precarbonating reactor having or approaching plug flow (very little forward or back mixing) allows the production of overbased calcium petroleum sulfonate having both an acceptable TBN and an acceptable turbidity under operating conditions in reaction systems that although otherwise similar but lacking the precarbonation system produced overbased petroleum sulfonate having marginal TBN and greater turbidity.

It is therefore an object of this invention to provide an overbased calcium petroleum sulfonate having high alkaline reserve and acceptable turbidity. It is another object of this invention to provide lubricating additive containing overbased calcium petroleum sulfonate having high alkaline reserve and acceptable turbidity. It is another object of the invention to provide a process for preparing an overbased calcium petroleum sulfonate having high alkaline reserve and acceptable turbidity. It is still another object of this invention to provide a process for preparing a lubricating additive containing overbased calcium petroleum sulfonate having a high alkaline reserve and acceptable turbidity.

Other aspects, concepts, and objects of this invention along with its several advantages will be apparent from a study of this disclosure and the appended claims.

STATEMENT OF THE INVENTION

According to this invention there is provided a method for overbasing a petroleum sulfonate in a multireaction system in which a feedstream comprising lime $(Ca(OH)_2)$, petroleum sulfonate, lubricating oil, methanol (MEOH), and naphtha is contacted in a plug flow reactor with carbon dioxide $(CO_2)$ with the carbon dioxide in an amount in a range of about 5 to about 10 percent by volume of the total $CO_2$ used in the process thereby producing a first treated product which thereafter is further contacted in at least one continuous stirred tank reactor with carbon dioxide in an amount in a range of about 95 to about 90 percent by volume of the total $CO_2$ used in the process. In an embodiment of this invention overbased calcium petroleum sulfonate is provided as a product of the process described above.

In further embodiments of the invention the first treated product is further contacted with carbon dioxide in a series of continuous stirred tank reactors with the effluent from each continuous stirred tank reactor being fed seriatim to the subsequent continuous stirred tank reactor as feedstock. In a preferred embodiment of the invention a series of three continuous stirred tank reactors is used for further contacting.

In another embodiment of this invention apparatus is provided for overbasing a petroleum sulfonate in a multi-reaction vessel system in which a vertical plug flow reactor to which inlet means for introducing a downflow of a feedstock comprising lime, neutral petroleum sulfonate, lubricating oil, methanol, and naphtha enters the top portion of the reactor and means for introducing carbon dioxide countercurrent flow enters the bottom portion of the reactor above outlet means from the reactor which transfers effluent reactions product to at least one continuous stirred reactor having continuous agitation means, means for inlet of additional $CO_2$, means for removing off gas from a vapor space and means for removing reaction product. In preferred embodiments of the invention a multplicity of continuous stirred reactors each like one just described are connected in series.

This invention provides a continuous process for producing a detergent-dispersive additive for motor oils by reacting carbon dioxide $(CO_2)$ with lime $Ca(OH)_2$ in the presence of methanol and simultaneously dispersing the resultant calcium carbonate ($CaCO_3$) in a 50/50 mixture of calcium petroleum sulfonate and No. 10 stock lubricating oil, i.e., a finished 100 neutral lube stock (100 SUS at 100° F.). The reaction is carried out in naphtha solvent. The product is then stripped of water and methanol, filtered to remove the solids and stripped of naphtha. The finished product is a colloidal dispersion of $CaCO_3$ in a range of about 20 to about 40 weight percent usually about 27 weight percent in the 50/50 calcium petroleum sulfonate/100 neutral stock mixture.

The petroleum sulfonates useful in the present invention can be described as neutral petroleum sulfonate prepared by sulfonating KC250 bright stock having viscosity of 200 SUS at 210° F. (See U.S. Pat. No. 3,135,693 incorporated hereby reference).

The neutral lube oil useful in this invention can be described as solvent refined 100 neutral lube oil stock having viscosity of 100 SUS at 100° F.

The lime, calcium hydroxide, useful in the present invention can have a surface area of about 5 to about 50 $M^2/g$. The lime is not soluble in the reaction mixture and is of sufficient density to tend to settle rapidly. A preferred hydrated lime or slaked lime $Ca(OH)_2$, is Kemilime manufactured by Ash Grove Cement Co., Kansas City, MO.

The methanol (MeOH) useful in this invention as a promoter/solvent is described as methanol having 0 to about 10 weight percent $H_2O$.

The naphtha used in this invention is described as petroleum naptha having boiling point range of about 80° to about 300° C.

The $CO_2$ useful in this invention is described as technical grade or chemically pure $CO_2$.

General reaction conditions to make overbased product having 300 total base number (defined as Mg.KOH equivalent/gram product) are as follows: The temperature for the carbonation reaction can range from 25° C. (77° F.) to 80° C. (176° F.), preferably 35° C. (95° F.) to 65° C. (149° F.). Pressure of the carbonation reaction can range from 1 psia to 30 psia, preferably 10 to 20 psia. The overbasing (carbonation) residence or reaction time can vary from 20 minutes to 120 minutes, preferably 50 to 70 minutes overall.

Feed component concentrations for the carbonation reaction are as follows:

| Component | Weight % of Total Feed | |
|---|---|---|
| | In General | Preferred |
| Carbon Dioxide ($CO_2$) | 2.0 to 10 | 4 to 7 |
| Hydrated Lime ($Ca(OH)_2$) | 5.0 to 20 | 10 to 15 |
| Neutral Oil (Calcium (Petroleum Sulfonate) | 5.0 to 15 | 7 to 12 |
| No. 10 Lubricating Oil Stock | 5.0 to 15 | 7 to 12 |
| Naphtha | 30.0 to 80.0 | 50 to 70 |
| Methanol | 2.0 to 10.0 | 3 to 7 |

The $CO_2$ is added as a vapor, lime as a solid and the rest of the components as liquids. In addition up to 1.0 weight percent water can be added in the feed and still achieve 300 total base number. Initial water concentrations greater than 1.0 weight percent, however, can be detrimental by reducing the base number of the product.

The invention is best described in conjunction with the drawing which is a schematic representation of a three reactor system followed by a purification system.

This invention can best be described in conjunction with the drawing which is a schematic drawing of a process for overbasing petroleum sulfonate using a precarbonation column and at least one continuous stirred tank reactor followed by recovery of product.

Referring now to the drawing, a process over which the invention is an improvement will be exemplified. 740 grams KemiLime through line (1), 738 grams of 100 neutral stock oil through line (3), 2,360 grams 31.3 percent petroleum sulfonate through line (5), 7,000 grams naphtha through line (7), and 452 grams methanol through line (9) were combined in line (11) and fed to continuous stirred reactor (13). Carbon dioxide was fed through line (15) beneath the liquid level (17) and near the blade (19) connected by rod (21) the motor drive (23) which provides the continuous agitation in reactor (13). The liquid feedstock mixture remained in the reactor for 20 minute residence time which approximates a feed rate of about 34 grams/minute. Reaction temperature was 44.5° C. Off-gas was removed above the liquid level through line (25) and a product was collected through line (27), valve (29) and line (31) to be passed into a product recovery system. Samples of the reactor product tabulated in Table I below show that a product of unacceptable total base number was produced that became hazy upon increased operation time.

TABLE I

| Time (hrs.) | 1 | 3.0 | 5.0 |
|---|---|---|---|
| Total Base Number | 184 | 211 | 191 |
| Hazy/Clear | Clear | Hazy | Hazy |

In a test run according to the process of this invention the same feedstock described above was fed through line (11) into precarbonation reactor (33) which here is a one-half inch I.D. by 36 inch long downflow pipe reactor. Carbon dioxide was fed through line (35) at a rate of 0.029 L/min. into the precarbonation reactor (33) to produce a first treated product which was passed through line (37) into continuous stirred tank reactor (13).

In continuous stirred tank reactor (13) additional carbon dioxide was fed through line (15) at a rate of 0.263 L/min. at a point near the agitator blade (19) and product was conducted from the continuous stirred tank reactor through line (27), valve (29) and line (31) for recovery.

The reaction temperature and liquid reactant feed rate through the continuous stirred reactor was maintained as nearly as possible to be the same both in the reactions with and without the precarbonation column. Table II below shows that even though the product produced with precarbonation column and one continuous stirred reactor was of low TBN level that the turbidity problem was relieved.

TABLE II

| Time (hrs.) | 1.0 | 3.0 | 5.0 |
|---|---|---|---|
| TBN | 192 | 208 | 209 |
| Hazy/Clear | Clear | Clear | Clear |

In a further reaction initially run for 4 hours not according to the method of this invention then subsequently run for 4 hours according to the method of this invention 1,081 grams KemiLime through line (1), 773.8 grams 100 neutral lubricating stock oil through line (3), 2,264 grams of 20.04 percent petroleum sulfonate through line (5), 6.696 grams naphtha through line (7), and 481 grams methanol through line (9) were combined to be fed through line (11) into a first continuous stirred tank reactor (13). Carbon dioxide was fed into the first reactor through line (15) at a rate that will be described below. The first continuous stirred reactor (13) is agitated by an agitator blade (19) attached by shaft (21) to agitator motor (23) to provide continuous agitation. Off-gas was removed above the liquid level through line (25). The first treated product, effluent from reactor (13) was passed through line (27), valve (37) and line (39) into a second continuous stirred tank reactor (41). Carbon dioxide was fed at a rate that will be described later through line (43) into the area below the liquid level (45) of reactor (41) and the tank was continuous agitated by agitator blade (47) connected by shaft (49) to motor (51). Off-gas was removed above the liquid level through line (53). A second treated product, effluent from tank (41), was removed through line (55) into third continuous stirred reactor (57). Carbon dioxide was fed through line (59) at a rate described below into the reactor which was agitated by agitator blade (61) attached by shaft (63) to agitator motor (65). Off-gas was removed through line (67) and a third treated product, the product of the process, was removed through line (69), valve (71) and line (73) for recovery processes.

For recovery, effluent from the last reactor is passed through line (74) into a dryer system (75) maintained at a temperature in a range of about 180° to about 220° F. in which water and methanol are removed through line (77). The dried liquid is then passed through line (79) to a filtering means, preferably a commercial rotary filter (81), from which solids are removed through line (83). The filtered liquid is passed through line (85) to a vacuum fractionator (87) in which the naphtha is removed as overhead through line (89) and the overbased petroleum sulfonate/100 neutral stock mixture is removed as product through line (91).

Table III below sets forth the conditions of carbon dioxide distribution and reaction temperature for the initial 4 hours of the run in the three continuous stirred tank reactors to which the total flow of carbon dioxide was in a ratio of mole carbon dioxide/mole calcium hydroxide of about 0.70.

TABLE III

| CSTR No. | 1 | 2 | 3 |
| --- | --- | --- | --- |
| $CO_2$ distribution wt. %: | 19.7 | 54 | 26.3 |
| Temp. °C.: | 42.4 | 45.5 | 42.2 |
| Total mole/mole $CO_2$:$Ca(OH)_2$ | 0.70 | | |

Thus according to the process of the present invention the final 3½ hours of the same test run was made in which the feedstock described above for the three continuous stirred reactors was passed through line (11) and into precarbonation column (33) which is the same pipe reactor as described above. Carbon dioxide at a rate that will be described below was passed through line (35) into the pipe reactor and the effluent was passed through line (37) into the first continuous stirred tank reactor (13). Carbon dioxide was passed into each of the three continuous stirred reactors (13), (41), (57) through lines (15), (43), (59) and effluent was passed from each of the reactors seriatim into the next with collection of product of the process through line (69), valve (71) and line (73).

Table IV below sets forth the distribution of the carbon dioxide and the reaction temperature in the precarbonator and each of the continuous stirred tank reactors (CSTR) with the total flow of carbon dioxide at a rate of moles carbon dioxide/moles calcium hydroxide of about 0.70 mole/mole.

TABLE IV

| Reactor | Precarbonator | CSTR 1 | CSTR 2 | CSTR 3 |
| --- | --- | --- | --- | --- |
| $CO_2$ distribution wt. % | 7.2 | 35.0 | 40.8 | 17.0 |
| Temp. °C. | 47.5 | 42.5 | 45.5 | 42.2 |

Table V describes an overbasing run in which for the first three hours product was produced using three conventional CSTR's in series. At approximately 3.5 hours, the operation of the reactor train was changed. A small volume precarbonation reactor was placed into operation upstream of the 3 CSTR's. The $CO_2$ distribution, and reactor temperatures for the first 3 hours is shown in Table III, and the $CO_2$ distribution and reactor temperatures for the remaining 3.5 hours of run with the precarbonation reactor are shown in Table IV. Note that although the TBN was acceptable for the first three hours, the turbidity was increasing with time (unacceptable). When the precarbonation reactor was placed in operation the TBN of the product increased while the turbidity decreased. This is an obvious improvement. The product produced without the precarbonation reactor became unacceptable after three hours of operation. While the product produced with the precarbonation reactor in operation improved with time.

TABLE V

| | No Precarbonation | | | | Precarbonation | | |
| --- | --- | --- | --- | --- | --- | --- | --- |
| Hours | 1 | 2 | 3 | 4 | 5 | 6 | 7.5 |
| Total Base Number | 318 | 323 | 318 | 321 | 343 | 341 | 331 |
| Turbidity* | 33 | 53 | 75 | 73 | 63 | 53 | 45 |

*Turbidity greater than 70 is visible to the eye and is not acceptable.

We claim:

1. An apparatus for overbasing a petroleum sulfonate in a multi-vessel system comprising:
   (a) a vertical plug flow reactor having inlet means for feedstock in the upper portion thereof, a product discharge means in a lower portion thereof, and an inlet means for carbon dioxide in the lower portion thereof above said reaction product discharge means,
   (b) a continuous stirred tank reactor having agitation means, inlet means for carbon dioxide, inlet means for feedstream, means for removing off-gas from a vapor space, and means for removing reaction product effluent, and
   (c) transfer means connected from the reaction product discharge means of said vertical plug flow reactor to said inlet feedstream means of said continuous tank reactor.

2. An apparatus for producing and recovering overbased petroleum sulfonate comprising:
   (a) the apparatus of claim 1;
   (b) means for substantially removing water and methanol from the reactor product effluent removed from said at least one continuous stirred tank reactor, said means for removing water and methanol connected to said means for removing reaction product effluent from said continuous stirred tank reactor to produce dried reactor product effluent;

(c) means for filtering said dried reactor product effluent to produced filtered, dried reactor product effluent, and (d) means for fractionating said filtered, dried reactor product effluent to remove naphtha overhead and recover overbased petroleum sulfonate/100 neutral stock mixture.

3. An apparatus according to claim 2 wherein said means for filtering is a rotary filter.

4. An apparatus for overbasing a petroleum sulfonate in a multi-vessel, system comprising:

(a) a vertical plug flow reactor having inlet means for feedstock in the upper portion thereof, a product discharge means in a lower portion thereof, and an inlet means for carbon dioxide in the lower portion thereof above said reaction product discharge means, (b) a multiplicity of continuous stirred tank reactors each having agitation means, inlet means for $CO_2$, inlet means for feedstream, means for removing off-gas from a vapor space, and means for removing reaction product effluent, (c) transfer means connecting said reaction product discharge means of said vertical plug flow reactor to said inlet feedstream means of one of said multiplicity of continuous stirred tank reactors, and (d) transfer means connecting in series said inlet means for feedstream of said succeeding continuous stirred tank reactors in said series to said reaction product discharge means of said immediately preceding continuous stirred tank reactor in said series except for the last of said continuous stirred tank reactors in said series.

5. An apparatus of claim 13 wherein said multiplicity of stirred tank reactors comprises three continuous stirred tank reactors.

6. An apparatus for producing and recovering overbased petroleum sulfonate comprising:

(a) the apparatus of claim 5;

(b) means for substantially removing water and methanol from the reactor product effluent removed from said at least last continuous stirred tank reactor, said means for removing water and methanol connected to said means for removing reaction product effluent from said continuous stirred tank reactor to produce dried reactor product effluent;

(c) means for filtering said dried r reactor product effluent to produced filtered, dried reactor product effluent, and (d) means for fractionating said filtered, dried reactor product effluent to remove naphtha over head and recover overbased petroleum sulfonate/100 neutral stock mixture.

7. An apparatus according to claim 6 wherein said means for filtering is a rotary filler.

8. An apparatus for producing and recovering overbased petroleum sulfonate comprising:

(a) the apparatus of claim 4;

(b) means for substantially removing water and methanol from the reactor product effluent removed from said at least last continuous stirred tank reactor, said means for removing water and methanol connected to said means for removing reaction product effluent from said continuous stirred tank rector to produce dried reactor product effluent, and 9. An apparatus according to claim 8 wherein said means for filtering is a rotary filter.

* * * * *

UNITED STATES PATENT AND TRADEMARK OFFICE
CERTIFICATE OF CORRECTION

PATENT NO. : 4,664,246
DATED : MAY 12, 1987
INVENTOR(S) : J. RONALD SPENCE and DOUGLAS S. JACK It is certified that error appears in the above-identified patent and that said Letters Patent is hereby corrected as shown below:

Claim 5. column 18, line 1, "13" should be "4"
Claim 7, column 8, line 22, "filler" should be "filter"
Claim 8, column 8, lines 32 and 33 the ", and" should be removed
      column 8, lines 32 and 33, the following
should be added "(c) means for filtering said dried reactor product effluent to produced filtered, dried reactor product effluent, and (d) means for fractionating said filtered, dried reactor product effluent to remove naptha overhead an recover overbased petroleum sulfonate/100 neutrol stock mixture."

Signed and Sealed this

Twenty-first Day of June, 1988

Attest:

DONALD J. QUIGG

Attesting Officer      Commissioner of Patents and Trademarks